(No Model.) 2 Sheets—Sheet 1.
H. LEINEWEBER.
MEAT CHOPPING APPARATUS.
No. 455,022. Patented June 30, 1891.
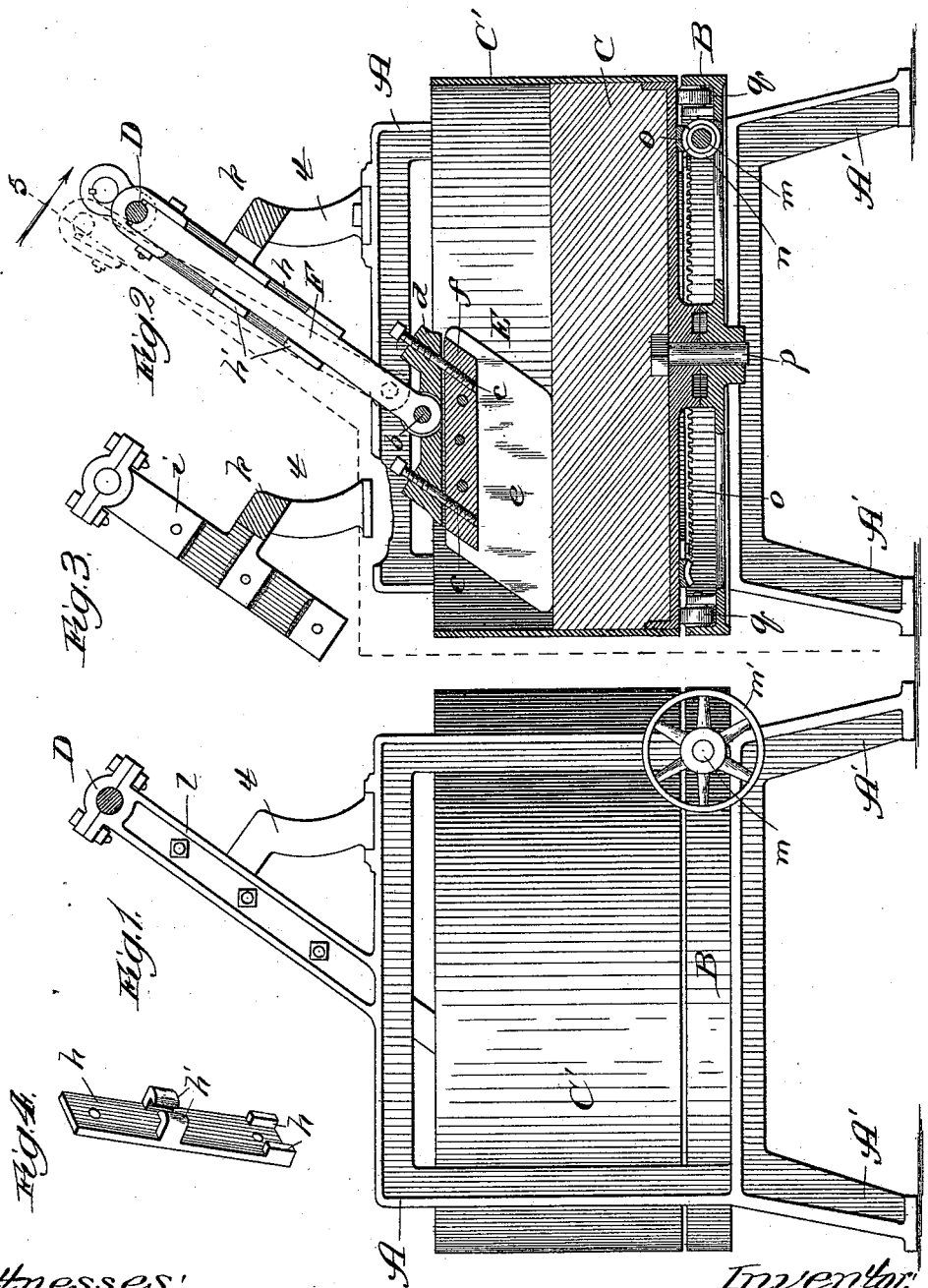

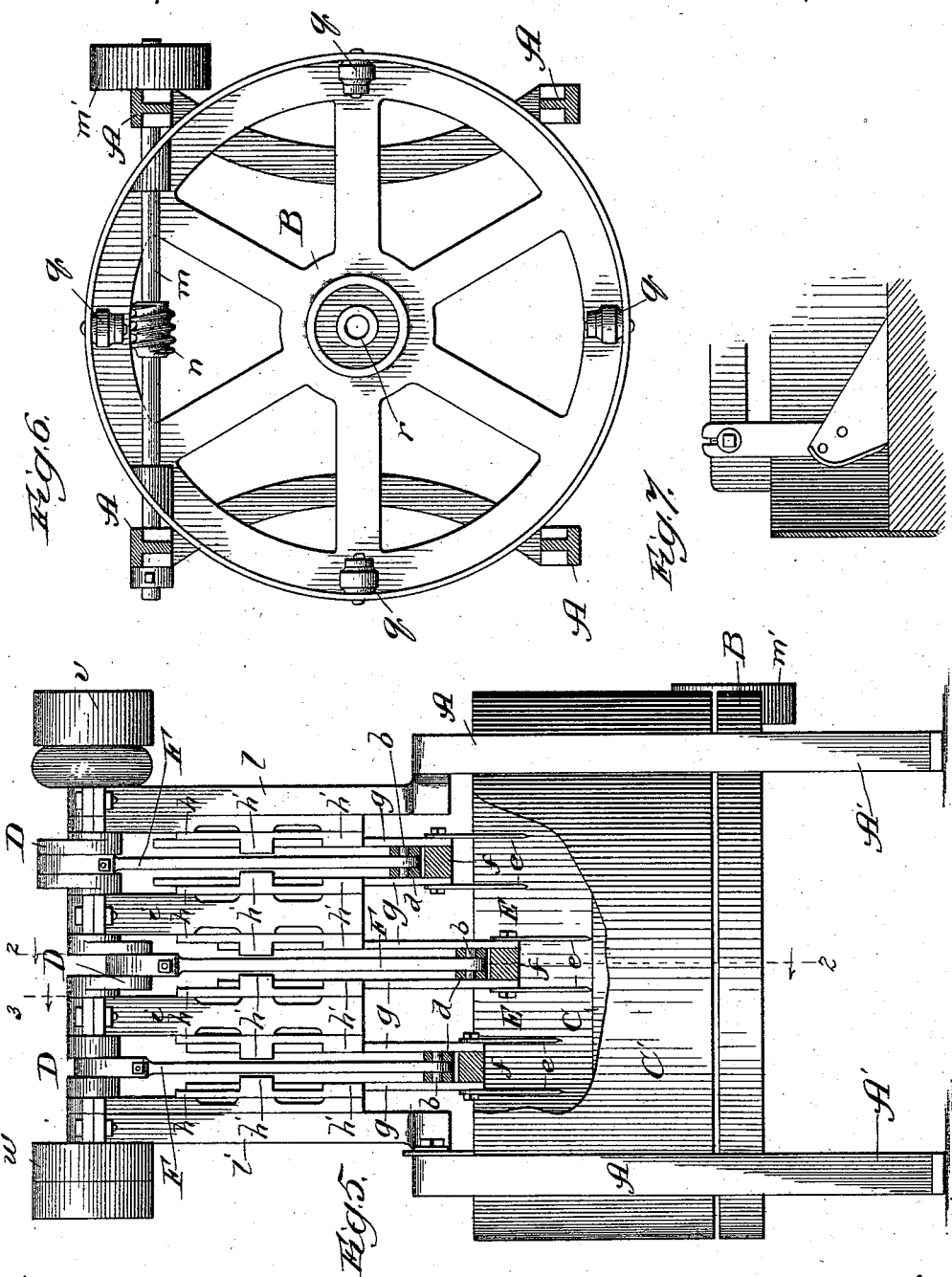

UNITED STATES PATENT OFFICE.

HERMAN LEINEWEBER, OF SOUTH CHICAGO, ASSIGNOR OF ONE-HALF TO FELIX AUERBACH, OF CHICAGO, ILLINOIS.

MEAT-CHOPPING APPARATUS.

SPECIFICATION forming part of Letters Patent No. 455,022, dated June 30, 1891.

Application filed March 30, 1891. Serial No. 386,962. (No model.)

*To all whom it may concern:*

Be it known that I, HERMAN LEINEWEBER, a citizen of the United States, residing at South Chicago, in the county of Cook and State of Illinois, have invented a new and useful Improvement in Meat-Chopping Apparatus, of which the following is a specification.

My invention relates to an improvement in the class of so-called "draw-cut meat-choppers," in contradistinction to those wherein the cutters are reciprocated vertically to effect merely a chopping or hacking operation.

The object of my invention is to provide a generally improved construction of meat-chopper of the class referred to which shall perform its work with greater rapidity than others involving the same principle of operation by directing the cutting action of the knives through inclined planes in contradistinction to directing it through undulating planes, which is old.

My invention consists in the general construction of my improvement, and it also consists in details of construction and combinations of parts pointed out in the claims.

In the accompanying drawings, Figure 1 is a view in side elevation of my improved device, with the cutter-crank shaft shown in section. Fig. 2 is a vertical section of the same, taken on the line 2 2 of Fig. 5 and viewed in the direction indicated by the arrows. Fig. 3 is a sectional view in side elevation, the section being taken at the line 3 on Fig. 5 and viewed as indicated by the arrow, but showing only the oblique arm, cross-bar, and knee-brace. Fig. 4 is a perspective view of a detail. Fig. 5 is a partly broken view taken on the line 5 of Fig. 2 and regarded in the direction indicated by the arrow. Fig. 6 is a plan sectional view taken at the line 6 on Fig. 1 and viewed as indicated by the arrow. Fig. 7 is a broken sectional view showing a known form of stationary adjustable meat-turner, the section being taken at the line 7 on Fig. 5 and viewed in the direction of the arrow.

A is the supporting-frame, formed of the two sides illustrated, having legs A', supporting the circular base B, provided at its center with a pivot-bearing $r$ and at intervals near its perimeter with rollers $q$.

C is the rotary chopping-block, surrounded by a metal shield C', which projects some distance above the upper side of the wooden block C to confine the meat while being chopped. The block is provided at the center of its bottom with a pivot $p$, seated in the pivot-bearing $r$ in the base B, which is hollowed out about its center, as illustrated. Around the bottom of the block C is a rack $o$, engaged by a worm $n$ on a rotary shaft $m$, supported in suitable bearings on the base B and carrying a belt-pulley $m'$ to be driven from the cutter-driving crank-shaft D, hereinafter described. The parts thus far described present no particular features of novelty.

The crank-shaft D, which has a crank for each of the cutter-tools employed, is journaled in bearings in the upper ends of backward-inclined arms $l$ and $l'$, extending from the upper sides of the frame A, with which they may be integral. A cross-bar $k$, carrying rigid transverse arms $i$ in any desired number according to the number of cutting devices employed, is provided at its opposite ends with bars $i'$, which, as also the arms $i$, extend obliquely parallel with the side arms, and, like the latter, the arms $i$ have bearings for the rotary crank-shaft D, adapted to be geared from a pulley $v$ with the worm-shaft pulley $m'$, and carrying a driving-pulley $w$. The cross-bar $k$, arms $i$, and bars $i'$ I form integral in one casting and secure it in place by bolting the bars $i'$ to the inner side of the arms $l$ and $l'$, as indicated in Fig. 1. The several arms $i$ should be recessed, as shown, at opposite sides, and the bars $i'$ at their inner sides, to lighten them and economize in metal, and to each of the said sides of the several arms is rigidly secured, as by bolting or riveting, a guide-bar $h$ for confining between their guides $h'$ adjacent pairs of reciprocating bars $g$, secured to opposite sides of the respective head-blocks $f$ of the cutters E. The bars $g$ of each cutter thus afford, practically, its stem.

I form each cutter E preferably with two blades $e$, having oblique ends, as shown, to extend in the direction of motion of the cutters, and thereby avoid their upward or withdrawing stroke carrying meat with them and ejecting it from the block C. The blades of each cutter are rigidly bolted to opposite sides of its head $f$, which is adjustably secured to a shoe $d$ by set-screws $c$ near its opposite ends, and which serve to raise or lower the head carrying the blades, for so adjusting the latter in accordance with the wear of the block C as to cause them to reach, at the end of their downward stroke, just to the surface of the block. Each block-carrying shoe $d$ is connected with a crank on the shaft D by a pitman F, joined at its lower end to the shoe by a pivot-pin $b$, and there having a rounded bearing $a$ against a recess in the top of the shoe to which the bearing is shown to conform.

As will thus be seen, the parts $l\ l'$, $i\ i'$, $h$, and $k$ together form a suitable inclined frame for supporting and guiding the cutters to reciprocate in an oblique plane.

Inside the shell C, to one side of the center of the chopping-block and beyond the plane of the cutters, is a stationary adjustable meat-turner. (Shown in Fig. 7, but involving no features of novelty, and not requiring, therefore, to be described.)

The operation is as follows: Rotation of the shaft D, when connected as described with the worm-shaft $q$, actuates the latter to revolve its worm $n$ and, by the engagement thereof with the rack $o$, rotate the block C on its pivot $p$. The rotation of the crank-shaft, furthermore, through the medium of the pitman F, reciprocates the cutters E in the oblique direction in which they are guided by the bars $g$ in the guides $h'$, thereby actuating the blades to exert a direct draw cut upon the meat. The cut being direct is materially longer than the undulatory cut hereinbefore referred to, thus increasing the rapidity of the operation, and, furthermore, owing to the directly oblique upward stroke, tending to prevent entanglement of the cutters with the meat and throwing of the latter out of the shell C', an effect hitherto commonly obviated by the provision of extra shields rising to an adequate height, but which materially augment the cost of the machine and encumber it.

What I claim as new, and desire to secure by Letters Patent, is—

1. In a meat-chopping apparatus, the combination, with a rotary block, of a crank-shaft, a cutter on a stem, an inclined guide in which the stem is confined to be reciprocated, and a pitman connecting the cutter with a crank on the said shaft, substantially as and for the purpose set forth.

2. In a meat-chopping apparatus, the combination, with the rotary block, of a crank-shaft, a cutter of adjustable construction on a stem, an inclined guide in which the stem is confined to be reciprocated, and a pitman connecting the cutter with a crank on the said shaft, substantially as and for the purpose set forth.

3. In a meat-chopping apparatus, the combination, with the rotary block, of a crank-shaft, a cutter having a blade formed with oblique ends, a stem secured to the cutter, an inclined guide in which the stem is confined to be reciprocated, and a pitman connecting the cutter with a crank on the said shaft, substantially as and for the purpose set forth.

4. In a meat-chopping apparatus, the combination, with the rotary block C, of a crank-shaft D, cutters E, comprising heads $f$, having blades $e$ secured to their sides, and shoes $d$, to which the heads are adjustably fastened, an inclined frame extending above the block and provided with inclined guide-bars $h$, bars $g$, secured at their lower ends to the cutter-heads and affording stems for the cutters confined to be reciprocated on the guide-bars, and pitmen F, connecting the cutters with the cranks of the said shaft, substantially as and for the purpose set forth.

5. A meat-chopping apparatus comprising, in combination with the rotary block C and its actuating mechanism supported on a frame A, an inclined frame extending over the block, a crank-shaft D, journaled in the inclined frame, guide-bars $h$, secured to the said frame in correspondingly-inclined positions, cutters E, each comprising a head $f$, having secured to its opposite sides blades $e$, formed with oblique ends and a shoe $d$, to which the head is adjustably secured by set-screws $c$, bars $g$, fastened at their lower ends to opposite sides of the cutter-heads and confined to be reciprocated obliquely on the said guide-bars, and pitmen F, pivotally connected at their lower ends with the cutter-shoes and having rounded bearings at their junctions with the shoes and connected at their upper ends with the cranks on the shaft D, the whole being constructed and arranged to operate substantially as described.

HERMAN LEINEWEBER.

In presence of—
J. W. DYRENFORTH,
M. J. FROST.